(12) United States Patent
Du et al.

(10) Patent No.: US 12,347,859 B2
(45) Date of Patent: *Jul. 1, 2025

(54) POSITIVE ACTIVE MATERIAL, POSITIVE ELECTRODE PLATE, ELECTROCHEMICAL ENERGY STORAGE APPARATUS, AND APPARATUS

(71) Applicant: CONTEMPORARY AMPEREX TECHNOLOGY (HONG KONG) LIMITED, Hong Kong (CN)

(72) Inventors: Rui Du, Ningde (CN); Yongchao Liu, Ningde (CN); Chongheng Shen, Ningde (CN); Sihui Wang, Ningde (CN); Na Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 70 days.

This patent is subject to a terminal disclaimer.

(21) Appl. No.: 18/321,318

(22) Filed: May 22, 2023

(65) Prior Publication Data

US 2023/0307635 A1 Sep. 28, 2023

Related U.S. Application Data

(63) Continuation of application No. 17/418,401, filed as application No. PCT/CN2019/129369 on Dec. 27, 2019, now Pat. No. 11,699,789.

(30) Foreign Application Priority Data

Dec. 29, 2018 (CN) .......................... 201811647026.X (51) Int. Cl.
| | | |
|---|---|---|
| *H01M 4/525* | (2010.01) | |
| *C01G 53/50* | (2025.01) | |
| *H01M 4/36* | (2006.01) | |
| *H01M 4/505* | (2010.01) | |
| *H01M 10/0525* | (2010.01) | |
| *H01M 4/02* | (2006.01) | |

(52) U.S. Cl.
CPC ............ *H01M 4/525* (2013.01); *C01G 53/50* (2013.01); *H01M 4/366* (2013.01); *H01M 4/505* (2013.01); *H01M 10/0525* (2013.01); *C01P 2002/54* (2013.01); *C01P 2004/51* (2013.01); *C01P 2004/61* (2013.01); *C01P 2006/12* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 11,949,093 | B2 * | 4/2024 | Du | .......................... H01M 4/134 |
| 2012/0104311 | A1 | 5/2012 | Levasseur | |
| 2020/0203706 | A1 | 6/2020 | Holman et al. | |

FOREIGN PATENT DOCUMENTS

| | | |
|---|---|---|
| CN | 101809788 A | 8/2010 |
| CN | 101847722 A | 9/2010 |
| CN | 102593442 A | 7/2012 |
| CN | 103339062 A | 10/2013 |
| CN | 104425795 A | 3/2015 |
| CN | 104852043 A | 8/2015 |
| CN | 105226271 A | 1/2016 |
| CN | 105958062 A | 9/2016 |
| CN | 103975464 B | 5/2017 |
| CN | 106716689 A | 5/2017 |
| CN | 108140829 A | 6/2018 |
| CN | 108206278 A | 6/2018 |
| CN | 108878795 A | 11/2018 |
| CN | 108923041 A | 11/2018 |
| CN | 110233259 A | 9/2019 |
| EP | 1391950 B1 | 8/2010 |

(Continued)

OTHER PUBLICATIONS

First Chinese office action dated Jun. 19, 2020 for Application No. CN 201811647026.X.
Second Chinese office action dated Aug. 21, 2020 for Application No. CN 201811647026.X.
First Chinese office action dated Oct. 20, 2021 for Application No. CN 202110077988.1.
Extended European Search Report dated Sep. 16, 2021 for Application No. EP 19901673.
International Search Report dated Mar. 27, 2020 for Application No. PCT/CN2019/129369.
Japanese office action dated Jul. 4, 2022 for Application No. JP 2021-538110.
Non-final office action dated Jul. 29, 2022 for U.S. Appl. No. 17/418,401.

(Continued)

*Primary Examiner* — Carlos Barcena
(74) *Attorney, Agent, or Firm* — Ladas & Parry LLP (57) ABSTRACT

This application provides a positive active material, a positive electrode plate, an electrochemical energy storage apparatus, and an apparatus. The positive active material is $Li_xNi_yCo_zM_kMe_pO_rA_m$, or $Li_xNi_yCo_zM_kMe_pO_rA_m$ with a coating layer on its surface; and the positive active material is single crystal or quasi-single crystal particles, and a particle size $D_n10$ of the positive active material satisfies: $0.3\ \mu m \leq D_n10 \leq 2\ \mu m$. In this application, particle morphology of the positive active material and an amount of micro powder in the positive active material are properly controlled, to effectively reduce side reactions between the positive active material and an electrolyte solution, decrease gas production of the electrochemical energy storage apparatus, and improve storage performance of the electrochemical energy storage apparatus without deteriorating an energy density, cycle performance, and rate performance of the electrochemical energy storage apparatus.

15 Claims, 4 Drawing Sheets

(56) References Cited

FOREIGN PATENT DOCUMENTS

| EP | 3168908 A1 | 5/2017 |
|----|------------|--------|
| JP | 2003109592 A | 4/2003 |
| JP | 2015026454 A | 2/2015 |
| JP | 2018172255 A | 11/2018 |
| WO | 2015132647 A1 | 9/2015 |

OTHER PUBLICATIONS

Particle Size Analyzers-Anton-Parr ( https:l/www .anton-paar. com/us-en/products/group/particle-size-analyzers/ ) downloaded Jan. 31, 2023.

Particle Size Testing-Clark Testing ( https:l/clarktesting.com/service/particle-size-testing/) downloaded Jan. 31, 2023.

What is Particle Size Distribution D10, D10 Particle Size aimsizer.com, Oct. 30, 2021.

Summons to attend oral proceedings for Application No. EPO 19901673.4, dated Apr. 25, 2024, 5 pages.

Yiming Sun et al., "Synthesis routes and formation rule of Ni-rich single crystal material based on the regulation of process lithium content," Journal of Power Sources, vol. 563, Feb. 18, 2023, 11 pages.

European Office Action for Application No. 19901673.4, mailed on Nov. 7, 2024, 8 pages.

\* cited by examiner

POSITIVE ACTIVE MATERIAL, POSITIVE ELECTRODE PLATE, ELECTROCHEMICAL ENERGY STORAGE APPARATUS, AND APPARATUS

CROSS REFERENCE TO RELATED APPLICATION

This application is a continuation of U.S. application Ser. No. 17/418,401 filed Jun. 25, 2021 which is a national phase entry under 35 USC 371 of International Patent Application No.: PCT/CN2019/129369 filed on Dec. 27, 2019 which claims the benefit of Chinese Application No. 201811647026.X filed on Dec. 29, 2018, the entire content of which is incorporated herein by reference.

TECHNICAL FIELD

This application relates to the field of electrochemical technologies, and in particular, to a positive active material, a positive electrode plate, an electrochemical energy storage apparatus, and an apparatus.

BACKGROUND

With the continuous escalation of energy crises and environmental problems, developing new green energy has become urgent. Lithium-ion batteries have been widely used in various fields due to their advantages such as high specific energy, a wide range of application temperatures, a low self-discharge rate, long cycle life, good safety performance, and no pollution. In addition, the replacement of conventional diesel vehicles with new energy vehicles using lithium-ion batteries as energy systems has also been gradually tried all over the world. At present, however, commonly used positive active materials such as lithium iron phosphate ($LiFePO_4$) and low-nickel ternary materials ($LiNi_{1/3}Co_{1/3}Mn_{1/3}O_2$) cannot fully meet requirements of lithium-ion batteries for energy densities due to the nature of the materials. Energy densities of lithium-ion batteries can be improved by increasing nickel content of the ternary material. Therefore, high-nickel ternary materials are currently one of main research objects of positive active materials of lithium-ion batteries. However, with the increase of the nickel content, side reactions between the ternary material and an electrolyte solution also increase significantly, which causes severe gas production in the lithium-ion batteries. This is currently one of biggest bottlenecks in commercial mass production of high-nickel ternary materials.

Currently, at a material level, methods for alleviating the gas production problem of lithium-ion batteries mainly include reducing content of nickel in the ternary material, and washing to reduce residual lithium content on a surface of the positive active material. However, the foregoing methods all cause different degrees of damage to performance of the lithium-ion batteries, for example, decreased reversible capacity per gram and deteriorated cycle performance of the lithium-ion batteries.

Therefore, effective technical methods are needed to allow lithium-ion batteries to have higher energy densities to meet increasingly stringent application requirements, while decreasing gas production of the lithium-ion batteries and improving storage performance of the lithium-ion batteries.

SUMMARY

In view of the problems existing in the background, an objective of this application is to provide a positive active material, a positive electrode plate, an electrochemical energy storage apparatus, and an apparatus. This application can effectively reduce side reactions between the positive active material and an electrolyte solution, decrease gas production of the electrochemical energy storage apparatus, and improve storage performance of the electrochemical energy storage apparatus without deteriorating an energy density, cycle performance, and rate performance of the electrochemical energy storage apparatus.

To achieve the foregoing objective, one aspect of this application provides a positive active material. The positive active material is $Li_xNi_yCo_zM_kMe_pO_rA_m$, or $Li_xNi_yCo_zM_k Me_pO_rA_m$ with a coating layer on its surface, where $0.85 \leq x \leq 1.15$, $0 < y < 1$, $0 < z < 1$, $0 < k < 1$, $0 \leq p \leq 0.1$, $1 \leq r \leq 2$, $0 \leq m \leq 1$, $m+r \leq 2$, M is selected from one or two of Mn and Al, Me comprises at least one element selected from the group consisting of Zr, Zn, Cu, Cr, Mg, Fe, V, Ti, Sr, Sb, Y, W, and Nb, and A comprises at least one element selected from the group consisting of N, F, S, and Cl. The positive active material is single crystal or quasi-single crystal particles, and a particle size $D_n10$ of the positive active material satisfies: $0.3\ \mu m \leq D_n10 \leq 2\ \mu m$.

According to another aspect of this application, this application provides a positive electrode plate, where the positive electrode plate includes the positive active material in the one aspect of this application.

According to still another aspect of this application, this application provides an electrochemical energy storage apparatus, where the electrochemical energy storage apparatus includes the positive active material in another aspect of this application.

According to yet another aspect of this application, this application provides an apparatus, where the apparatus is a vehicle and includes the electrochemical energy storage apparatus in the still another aspect of this application.

The beneficial effects of this application include the following:

In this application, particle morphology of the positive active material and an amount of micro powder in the positive active material are properly controlled, to effectively reduce side reactions between the positive active material and the electrolyte solution, decrease gas production of the electrochemical energy storage apparatus, and improve storage performance of the electrochemical energy storage apparatus without deteriorating an energy density, cycle performance, and rate performance of the electrochemical energy storage apparatus. The apparatus in this application includes the electrochemical energy storage apparatus, and therefore has at least the same advantages as the electrochemical energy storage apparatus.

DESCRIPTION OF REFERENCE SIGNS 1. battery pack;
2. upper cabinet body;
3. lower cabinet body;
4. battery module; and
5. electrochemical energy storage apparatus.

DESCRIPTION

The following describes in detail a positive active material and a preparation method, a positive electrode plate, an electrochemical energy storage apparatus, and an apparatus in this application.

First described is the positive active material according to the first aspect of this application.

The positive active material according to the first aspect of this application is $Li_xNi_yCo_zM_kMe_pO_rA_m$, or $Li_xNi_yCo_zM_kMe_pO_rA_m$ with a coating layer on its surface, where $0.85 \leq x \leq 1.15$, $0<y<1$, $0<z<1$, $0<k<1$, $0 \leq p<0.1$, $1 \leq r \leq 2$, $0 \leq m \leq 1$, $m+r \leq 2$, M is selected from one or two of Mn and Al, Me comprises at least one element selected from the group consisting of Zr, Zn, Cu, Cr, Mg, Fe, V, Ti, Sr, Sb, Y, W, and Nb, and A comprises at least one element selected from the group consisting of N, F, S, and Cl.

In an actual production process of a ternary material, due to problems of possible impurity and a low melting point of a raw material lithium salt used, melting, decomposition, and volatilization loss may occur on the ternary material at a relatively low temperature. Therefore, in a process of preparing the ternary material, excessive lithium salt is added to compensate for lithium loss caused during a sintering process. A surface of the ternary material has active oxygen anions, which react with $CO_2$ and $H_2O$ in the air to form carbonate. Meanwhile, lithium ions migrate from the body to the surface and form $Li_2CO_3$ on the surface of the ternary material. This process is accompanied by formation of a distorted surface oxide layer resulting from deoxidization of the surface of the ternary material. In addition, adding the excessive lithium salt during synthesis of the ternary material results in that main products of the excessive lithium salt calcined at high temperature are oxides of Li. The oxides of Li react with $CO_2$ and $H_2O$ in the air to form LiOH and $Li_2CO_3$, which remain on the surface of the ternary material, resulting in a relatively high pH value of the ternary material. In addition, during a charging and discharging process, $Li_2CO_3$ remaining on the surface of the ternary material decomposes to generate $CO_2$. Because a pressure of the $CO_2$ gas changes with a temperature (especially when a reaction process is accompanied by a thermal reaction), swelling of an electrochemical energy storage apparatus is intensified, and storage performance of the electrochemical energy storage apparatus is deteriorated.

Providing a coating layer on a surface of $Li_xNi_yCo_zM_kMe_pO_rA_m$ can reduce residual lithium content (such as LiOH or $Li_2CO_3$) on the surface of the positive active material to a specific extent, and achieve the purpose of improving storage performance of the electrochemical energy storage apparatus. In addition, providing a coating layer on a surface of $Li_xNi_yCo_zM_kMe_pO_rA_m$ can also reduce a probability of side reactions due to direct contact between $Li_xNi_yCo_zM_kMe_pO_rA_m$ and an electrolyte solution, thereby further reducing an amount of oxygen released for balancing charges by the positive active material during the charging and discharging process, and reducing the risk of crystal structure collapse therefrom, where content of $Li_2CO_3$ on the surface of the positive active material obtained by providing a coating layer on the surface of $Li_xNi_yCo_zM_kMe_pO_rA_m$ is less than that of LiOH. Preferably, on the surface of the positive active material obtained by providing a coating layer on the surface of $Li_xNi_yCo_zM_kMe_pO_rA_m$, the content of $Li_2CO_3$ is less than 3000 ppm, and the content of LiOH is less than 5000 ppm.

The positive active material in the first aspect of this application is single crystal or quasi-single crystal particles, and a particle size $D_n10$ of the positive active material satisfies: $0.3~\mu m \leq D_n10 \leq 2~\mu m$. Preferably, the particle size $D_n10$ of the positive active material satisfies: $0.5~\mu m \leq D_n10 \leq 1.5~\mu m$.

An energy density, storage performance, cycle performance, and rate performance of the electrochemical energy storage apparatus are closely associated with physical and chemical properties of the positive active material. The ternary material is a positive active material that mainly includes transition metal elements Ni and Co adjacent to each other in a same period, and achieves charge balance through changes in valence states of Ni and Co, where Ni is one of main active metal components, and mainly in the form of +2 valence. In a process of lithiation/delithiation, $Ni^{2+}$ is oxidized to $Ni^{3+}$ and $Ni^{4+}$. Co is also one of the active metal components, and mainly in the form of +3 valence. In a process of lithiation/delithiation, $Co^{3+}$ is oxidized to $Co^{4+}$. Therefore, in a process of lithiation/delithiation, the ternary material mainly achieves charge balance through changes in valence states of Ni and Co. As proportions of Ni and Co change, the energy density, storage performance, cycle performance, and rate performance of the electrochemical energy storage apparatus change to different degrees.

In the ternary material, higher Ni content usually indicates larger capacity per gram of the ternary material, and is more helpful in increasing the energy density of the electrochemical energy storage apparatus. However, when the Ni content in the ternary material is relatively high, a layered structure of the ternary material collapses due to mixing of $Ni^{2+}$ and $Li^+$, making $Li^+$ more difficult to be deintercalated/intercalated in the ternary material, and ultimately leading to deterioration of the cycle performance of the electrochemical energy storage apparatus. An increase of the Ni content in the ternary material further reduces a thermal decomposition temperature of the ternary material, resulting in more heat release and deterioration of thermal stability of the ternary material. When the Ni content in the ternary material increases, content of $Ni^{4+}$ with strong oxidation also increases. When the electrolyte solution comes into contact with the ternary material, more side reactions between the electrolyte solution and the ternary material occur, and in order to maintain charge balance, the ternary material releases oxygen. This not only destroys a crystal structure of the ternary material, but also aggravates the swelling of the electrochemical energy storage apparatus and deteriorates the storage performance of the electrochemical energy storage apparatus.

The energy density, storage performance, cycle performance, and rate performance of the electrochemical energy storage apparatus are further affected by a compaction density of the positive active material, and the compaction density of the positive active material is mainly affected by morphology and a structure of the positive active material. At present, a commonly used ternary material is usually secondary particles formed by agglomeration of primary particles; and is mostly spherical and has poor uniformity. There are a relatively large number of voids between the primary particles forming the secondary particles, resulting in a low compaction density of the positive electrode plate and accordingly affecting the energy density of the electrochemical energy storage apparatus. In addition, compression resistance capabilities of the secondary particles are relatively weak, and during a compaction process, some of the secondary particles may be crushed. Some of the crushed particles fall off the positive electrode plate because they are not in contact with a binder, and some of the crushed particles are not in contact with a conductive agent, resulting in local deterioration of performance of the positive electrode plate.

Therefore, in comprehensive consideration of impact of the foregoing factors on the energy density, storage performance, cycle performance, and rate performance of the electrochemical energy storage apparatus, the positive active material in the first aspect of this application is a ternary material in single crystal or quasi-single crystal particle morphology: $Li_xNi_yCo_zM_kMe_pO_rA_m$, or $Li_xNi_yCo_zM_kMe_pO_rA_m$ with a coating layer on its surface. Because there are no voids inside the single crystal or quasi-single crystal particles, the single crystal or quasi-single crystal particles are in close contact with each other and have small voids after being made into the positive electrode plate, which is helpful in increasing the compaction density of the positive electrode plate and enhancing the energy density of the electrochemical energy storage apparatus. Because the single crystal or quasi-single crystal particles have internal lattice with fewer defects and high structural stability, they can provide a three-dimensional channel for migration and diffusion of lithium ions and accelerate a migration rate of the lithium ions during the charging and discharging process of the electrochemical energy storage apparatus, and therefore do not deteriorate the cycle performance and rate performance of the electrochemical energy storage apparatus.

For the ternary material with single crystal or quasi-single crystal particle morphology, content of lithium and nickel in single crystal or quasi-single crystal particles of a small particle size is usually greater than an average value (that is, excessive lithium and nickel), while content of lithium and nickel in single crystal or quasi-single crystal particles of a large particle size is less than the average value (that is, insufficient lithium and nickel). During a charging process, due to polarization, excessive delithiation always occurs on single crystal or quasi-single crystal particles of a small size, resulting in damage to a structure of the single crystal or quasi-single crystal particles. In addition, compared with a single crystal or quasi-single crystal particle of a large particle size, a single crystal or quasi-single crystal particle of a small particle size has a larger specific surface area and has more side reactions when coming into contact with the electrolyte solution. To maintain charge balance, the single crystal or quasi-single crystal particle of a small particle size releases more oxygen, which not only destroys a crystal structure of the single crystal or quasi-single crystal particle of a small particle size, but also aggravates the swelling of the electrochemical energy storage apparatus and deteriorates the storage performance of the electrochemical energy storage apparatus.

In addition, generally, for a positive active material with a wide range of particle size distribution, a volume percentage of powder of a small particle size, especially micro powder, in the positive active material is insignificant. Therefore, it is not accurate to express content of the micro powder in the positive active material by using a conventional volume particle size, and it is more accurate and intuitive to express the content of the micro powder in the positive active material by using a number particle size, which is helpful in properly controlling the swelling of the electrochemical energy storage apparatus.

The positive active material in the first aspect of this application is further a ternary material $Li_xNi_yCo_zM_kMe_pO_rA_m$, or $Li_xNi_yCo_zM_kMe_pO_rA_m$ with a coating layer on its surface, with a particle size $D_n10$ satisfying $0.3\ \mu m \leq D_n10 \leq 2\ \mu m$, which can effectively reduce a probability of damaging the structure of the positive active material with single crystal or quasi-single crystal particle morphology and decrease the gas production.

Therefore, in this application, particle morphology of the positive active material and an amount of micro powder in the positive active material are properly controlled, to effectively reduce side reactions between the positive active material and the electrolyte solution, decrease gas production of the electrochemical energy storage apparatus, and improve storage performance of the electrochemical energy storage apparatus without deteriorating an energy density, cycle performance, and rate performance of the electrochemical energy storage apparatus.

Preferably, in $Li_xNi_yCo_zM_kMe_pO_rA_m$, $0.50 \leq y \leq 0.90$, $0.05 \leq z \leq 0.2$, $0.05 \leq k \leq 0.4$, and $0 \leq p \leq 0.05$.

More preferably, in $Li_xNi_yCo_zM_kMe_pO_rA_m$, $0.70 \leq y \leq 0.90$, $0.05 \leq z \leq 0.2$, $0.05 \leq k \leq 0.2$, and $0 \leq p \leq 0.05$. For a ternary material with higher nickel content ($0.70 \leq y \leq 0.90$), a relative amount of micro powder of a small particle size has more significant impact on residual lithium content and gas production of the positive active material. Therefore, controlling $D_n10$ of the high-nickel ternary material with single crystal or quasi-single crystal particle morphology: $Li_xNi_yCo_zM_kMe_pO_rA_m$, or $Li_xNi_yCo_zM_kMe_pO_rA_m$ with a coating layer on its surface to be within 0.3 µm to 2 µm is an effective means to solve the problem of gas production.

Specifically, $Li_xNi_yCo_zM_kMe_pO_rA_m$ may be $LiNi_{1/3}Co_{1/3}Mn_{1/3}O_2$, $LiNi_{0.5}Co_{0.2}Mn_{0.3}O_2$, $LiNi_{0.5}Co_{0.25}Mn_{0.25}O_2$, $LiNi_{0.55}Co_{0.15}Mn_{0.3}O_2$, $LiNi_{0.55}Co_{0.1}Mn_{0.35}O_2$, $LiNi_{0.55}Co_{0.05}Mn_{0.4}O_2$, $LiNi_{0.6}Co_{0.2}Mn_{0.2}O_2$, $LiNi_{0.75}Co_{0.1}Mn_{0.15}O_2$, $LiNi_{0.8}Co_{0.1}Mn_{0.1}O_2$, $LiNi_{0.85}Co_{0.05}Mn_{0.1}O_2$, $LiNi_{0.88}Co_{0.05}Mn_{0.07}O_2$, or $LiNi_{0.9}Co_{0.05}Mn_{0.05}O_2$, or may be a substance obtained through modification by partially substituting the doping element Me and/or the doping element A for an element in the foregoing substance.

In the positive active material according to the first aspect of this application, coating the surface of $Li_xNi_yCo_zM_kMe_pO_rA_m$ can avoid direct contact between $Li_xNi_yCo_zM_kMe_pO_rA_m$ and the electrolyte solution, and reduce side reactions between the positive active material and the electrolyte solution. Preferably, a coating element in the coating layer is selected from one or a combination of Al, Ba, Zn, Ti, Co, W, Y, Si, Sn, B, and P. More preferably, a coating element in the coating layer is selected from a combination of two or more of Al, Ba, Zn, Ti, Co, W, Y, Si, Sn, B, and P.

Preferably, the coating layer includes an oxide of the foregoing coating element. More preferably, the coating layer includes oxides formed by two or more of the foregoing coating elements. When the coating layer includes oxides formed by the at least two coating elements, stability of adhesion of the coating layer to the surface of $Li_xNi_y Co_zM_kMe_pO_rA_m$ can be improved, so that the coating layer has a specific degree of ion conductivity and electron conductivity, thereby mitigating impact of the coating layer on polarization of the positive active material.

In the positive active material in the first aspect of this application, the particle size $D_n10$ of the positive active material measured in m and a particle size $D_v10$ of the positive active material measured in m satisfy: $0.15 \leq D_n10 \times D_v10 \leq 6$. More preferably, the particle size $D_n10$ of the positive active material measured in m and the particle size $D_v10$ of the positive active material measured in m satisfy: $0.45 \leq D_n10 \times D_v10 \leq 6$, where $D_v10$ is a corresponding particle size when a cumulative volume distribution percentage of the positive active material reaches 10%, and $D_n10$ is a corresponding particle size when a cumulative number distribution percentage of the positive active material reaches 10%. When a product of $D_n10$ and $D_v10$ of the positive active material is within the foregoing range, it indicates that a relative amount of micro powder of an excessively small particle size in the positive active material is relatively small, and that the capacity of the positive active material is relatively high. This is helpful in alleviating the problem of gas production of the positive active material while ensuring that a volumetric energy density of the electrochemical energy storage apparatus is relatively high.

Preferably, the particle size $D_v10$ of the positive active material is 0.5 μm to 3 μm. More preferably, the particle size $D_v10$ of the positive active material is 1 μm to 2 μm.

In the positive active material according to the first aspect of this application, a theoretical specific surface area $BET_1$ of the positive active material and an actual specific surface area $BET_2$ of the positive active material satisfy: $0.3 \leq (BET_2 - BET_1)/BET_1 \leq 5.5$.

The theoretical specific surface area of the positive active material $BET_1 = 6/(\rho \times D_v50)$. $\rho$ is an actual density of the positive active material, with a unit of measurement being g/cm³. $D_v50$ is a corresponding particle size when the cumulative volume distribution percentage of the positive active material reaches 50%, with a unit of measurement being m.

The actual specific surface area $BET_2$ of the positive active material can be measured by using the $N_2$ adsorption method. For details, refer to GB/T19587-2004.

In this application, $(BET_2-BET_1)/BET_1$ represents a degree of deviation between the theoretical specific surface area and the actual specific surface area of the positive active material, and can reflect a degree of unevenness on the surface of the positive active material. Controlling the degree of deviation between the theoretical specific surface area and the actual specific surface area of the positive active material to be within a specific range can ensure that the surface of the positive active material formed is relatively flat, with fewer unevenness structures, and can also indicate a relatively good uniformity of sizes of the single crystal or quasi-single crystal particles. This is helpful in reducing the polarization of the positive active material, improving ion transport performance, further decreasing the gas production, and optimizing dynamic performance.

Preferably, the actual specific surface area $BET_2$ of the positive active material is 0.5 m²/g to 1.5 m²/g. When the actual specific surface area of the positive active material is within the foregoing range, a contact area between the electrolyte solution and the positive active material is relatively small. This is helpful in inhibiting side reactions, and avoiding that the swelling problem of the electrochemical energy storage apparatus is aggravated because of corrosion damage caused by the electrolyte solution to the crystal structure of the positive active material. In addition, when the actual specific surface area of the positive active material is within the foregoing range, it is further helpful in achieving relatively strong adhesion of the positive active material to the binder and the conductive agent with fewer auxiliary materials in making a positive slurry through mixing, thereby helping to increase the energy density of the electrochemical energy storage apparatus.

Preferably, the particle size $D_v50$ of the positive active material is 1 μm to 6 μm. More preferably, the particle size $D_v50$ of the positive active material is 2 μm to 5 μm.

Preferably, a particle size $D_v90$ of the positive active material is 3 μm to 12 μm. More preferably, the particle size $D_v90$ of the positive active material is 3 μm to 10 μm.

In the positive active material according to the first aspect of this application, preferably, a differential particle size distribution curve of the positive active material has one and only one peak. The differential particle size distribution curve includes both a differential volume-based particle size distribution curve and a differential number-based particle size distribution curve.

Next described is the method for preparing a positive active material according to the second aspect of this application, which is used to prepare the positive active material in the first aspect of this application. The method includes the following steps: placing a ternary material precursor (a compound containing Ni, Co, and M), a Li-containing compound, a compound containing the doping element Me, and a compound containing the doping element A into a mixing device for mixing, then placing them into an atmosphere furnace for sintering, and after the sintering is completed, performing graded screening to obtain the positive active material.

A manner of graded screening is not specifically limited, and can be selected based on an actual condition. Preferably, the graded screening may be air flow graded screening or sieve-based screening.

A specific process of the air flow graded screening is as follows: A sintered material is put into an air flow classifier, and the sintered material is then ejected from a nozzle with an air flow of a specific pressure; particles are separated by size by using the principle that particles of different sizes have inconsistent weights, where a particle with a smaller weight is lighter and flies closer, while a particle with a larger weight is heavier and flies farther. A distance between a collector and the nozzle is adjusted to screen an appropriate particle size, so as to obtain the positive active material.

A specific process of the sieve-based screening is as follows: A sintered material is put into a 200- to 1000-mesh sieve for sieving. Due to different particle sizes of the particles, particles of a small particle size are screened out by the sieve, and particles of a required particle size can be retained on the sieve, to obtain the positive active material. Preferably, a number of meshes of the sieve is 500 meshes to 800 meshes.

The ternary material precursor may include but is not limited to: $Ni_{1/3}Co_{1/3}Mn_{1/3}(OH)_2$, $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.5}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, and $0.9Ni_{0.9}Co_{0.05}Mn_{0.05}(OH)_2 \cdot 0.1Al_2(OH)_3$.

The Li-containing compound may include but is not limited to one or a combination of $LiOH \cdot H_2O$, LiGH, $Li_2CO_3$, and $Li_2O$.

The compound containing the doping element Me may be one or a combination of an oxide, nitrate, and carbonate containing at least one element of Zr, Zn, Cu, Cr, Mg, Fe, V, Ti, Sr, Sb, Y, W, and Nb.

The compound containing the doping element A may include but is not limited to one or a combination of LiF, NaCl, $Na_2S$, and $Li_3N$.

Conditions of the sintering may be 700° C. to 800° C., and oxygen concentration≥20%.

Next described is another method for preparing a positive active material according to the third aspect of this application, which is used to prepare the positive active material in the first aspect of this application. The method includes the following steps: S1. Place a ternary material precursor (a compound containing Ni, Co, and M), a Li-containing compound, a compound containing the doping element Me, and a compound containing the doping element A into a mixing device for mixing, and then place them into an atmosphere furnace for primary sintering. S2. Place a material obtained after the primary sintering and a compound containing the coating element into the mixing device for mixing, and then place them into the atmosphere furnace for secondary sintering. S3. Perform graded screening on a material obtained after the secondary sintering to obtain the positive active material.

A manner of graded screening is not specifically limited, and can be selected based on an actual condition. Preferably, the graded screening may be air flow graded screening or sieve-based screening.

A specific process of the air flow graded screening is as follows: The material obtained after the secondary sintering is put into an air flow classifier, and the material is then ejected from a nozzle with an air flow of a specific pressure; particles are separated by size by using the principle that particles of different sizes have inconsistent weights, where a particle with a smaller weight is lighter and flies closer, while a particle with a larger weight is heavier and flies farther. A distance between a collector and the nozzle is adjusted to screen an appropriate particle size, so as to obtain the positive active material.

A specific process of the sieve-based screening is as follows: The material obtained after the secondary sintering is put into a 200- to 1000-mesh sieve for sieving. Due to different particle sizes of the particles, particles of a small particle size are screened out by the sieve, and particles of a required particle size can be retained on the sieve, to obtain the positive active material. Preferably, a number of meshes of the sieve is 500 meshes to 800 meshes.

The ternary material precursor may include but is not limited to: $Ni_{1/3}Co_{1/3}Mn_{1/3}(OH)_2$, $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.5}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, and $0.9Ni_{0.9}Co_{0.05}Mn_{0.05}(OH)_2 \cdot 0.1Al_2(OH)_3$.

The Li-containing compound may include but is not limited to one or a combination of $LiOH \cdot H_2O$, LiGH, $Li_2CO_3$, and $Li_2O$.

The compound containing the doping element Me may be one or a combination of an oxide, nitrate, and carbonate containing at least one element of Zr, Zn, Cu, Cr, Mg, Fe, V, Ti, Sr, Sb, Y, W, and Nb.

The compound containing the doping element A may include but is not limited to one or a combination of LiF, NaCl, $Na_2S$, and $Li_3N$.

The compound containing the coating element may be one or a combination of an oxide, nitrate, phosphate, and carbonate containing one or more elements of Al, Ba, Zn, Ti, Co, W, Y, Si, Sn, B, and P. A usage amount of the compound containing the coating element may be 0.01% to 0.5% of total mass of the positive active material.

Conditions of the primary sintering may be 700° C. to 800° C., and oxygen concentration≥20%.

A condition of the secondary sintering may be 200° C. to 700° C.

Next described is the positive electrode plate according to the fourth aspect of this application. The positive electrode plate includes a positive electrode current collector and a positive membrane that is provided on at least one surface of the positive electrode current collector and that includes the positive active material according to the first aspect of this application.

In the positive electrode plate according to the fourth aspect of this application, the positive membrane may be disposed on one surface of the positive electrode current collector, or may be disposed on two surfaces of the positive electrode current collector.

In the positive electrode plate according to the fourth aspect of this application, the positive membrane may further include a conductive agent and a binder, where types and content of the conductive agent and the binder are not specifically limited, and may be selected based on actual needs. The binder usually includes a fluorine-containing polyolefin binder. For the fluorine-containing polyolefin binder, water is usually a good solvent, that is, the fluorine-containing polyolefin binder usually has good solubility in water. For example, the fluorine-containing polyolefin binder may include but is not limited to polyvinylidene fluoride (PVDF), vinylidene fluoride copolymer or a modified (for example, modified with carboxylic acid, acrylic acid, or acrylonitrile) derivative thereof, or the like. The conductive agent may be various conductive agents suitable for an electrochemical energy storage apparatus in the art, for example, including but not limited to one or a combination of acetylene black, conductive carbon black, carbon fiber, carbon nanotube, and Ketjen black.

In the positive electrode plate according to the fourth aspect of this application, a type of the positive electrode current collector is not specifically limited either, and may be selected based on actual needs. The positive electrode current collector may usually be a layer body, and the positive electrode current collector is usually a structure or component that can collect a current. The positive electrode current collector may be various materials suitable to be used as a positive electrode current collector of an electrochemical energy storage apparatus in the art. For example, the positive electrode current collector may include but is not limited to a metal foil, and more specifically, may include but is not limited to a nickel foil or an aluminum foil.

Next described is the electrochemical energy storage apparatus according to the fifth aspect of this application. The electrochemical energy storage apparatus includes the positive active material in the first aspect of this application.

In the electrochemical energy storage apparatus in the fifth aspect of this application, it should be noted that the electrochemical energy storage apparatus may be a supercapacitor, a lithium-ion battery, a lithium metal battery, or a sodium-ion battery. In the embodiments of this application, only an embodiment in which the electrochemical energy storage apparatus is a lithium-ion battery is provided, but this application is not limited thereto.

The electrochemical energy storage apparatus in the fifth aspect of this application may include a positive electrode plate, a negative electrode plate, a separator sandwiched between the positive electrode plate and the negative electrode plate, and an electrolyte solution, where the positive electrode plate is the positive electrode plate in the fourth aspect of this application, and the positive electrode plate includes the positive active material in the first aspect of this application.

A method for preparing the electrochemical energy storage apparatus should be known to those skilled in the art. For example, the positive electrode plate, the separator, and the negative electrode plate each may be a layer body, which thus can be cut to a target size and then stacked in sequence, also can be wound to a target size to form an electrode assembly, and can be further combined with the electrolyte solution to form the electrochemical energy storage apparatus.

In the electrochemical energy storage apparatus, the negative electrode plate usually includes a negative electrode current collector and a negative active material layer that is located on a surface of the negative electrode current collector. The negative active material layer usually includes a negative active material. The negative active material may be various materials suitable for a negative active material of an electrochemical energy storage apparatus in the art, for example, including but not limited to one or a combination of graphite, soft carbon, hard carbon, carbon fiber, a mesophase carbon microsphere, a silicon-based material, a tin-based material, lithium titanate, and another metal that can form an alloy with lithium. The graphite may be selected from one or a combination of artificial graphite, natural graphite, and modified graphite. The silicon-based material may be selected from one or a combination of elemental silicon, a silicon-oxygen compound, a silicon-carbon composite, and a silicon alloy. The tin-based material may be selected from one or a combination of elemental tin, a tin-oxygen compound, and a tin alloy. The negative electrode current collector is usually a structure or component that collects a current. The negative electrode current collector may be various materials suitable to be used as a negative electrode current collector of an electrochemical energy storage apparatus in the art. For example, the negative electrode current collector may include but is not limited to a metal foil, and more specifically, may include but is not limited to a copper foil.

In the electrochemical energy storage apparatus, the negative electrode plate may alternatively be a lithium plate.

In the electrochemical energy storage apparatus, the separator may be various materials suitable for a separator of an electrochemical energy storage apparatus in the art, for example, including but not limited to one or a combination of polyethylene, polypropylene, polyvinylidene fluoride, aramid, polyethylene terephthalate, polytetrafluoroethylene, polyacrylonitrile, polyimide, polyamide, polyester, and natural fiber.

In the electrochemical energy storage apparatus, the electrolyte solution may be various electrolyte solutions suitable for an electrochemical energy storage apparatus in the art. For example, the electrolyte solution usually includes an electrolyte and a solvent, and the electrolyte may usually include lithium salt. More specifically, the lithium salt may be inorganic lithium salt and/or organic lithium salt, and may specifically include but is not limited to one or a combination of $LiPF_6$, $LiBF_4$, $LiN(SO_2F)_2$ (LiFSI for short), $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, concentration of the electrolyte may be 0.8 mol/L to 1.5 mol/L. The solvent may be various solvents suitable for an electrolyte solution of an electrochemical energy storage apparatus in the art. The solvent of the electrolyte solution is usually a non-aqueous solvent, preferably an organic solvent, and may specifically include but is not limited to one or a combination of ethylene carbonate, propylene carbonate, 2,3-butylene carbonate, prenyl carbonate, dimethyl carbonate, diethyl carbonate, dipropyl carbonate, ethyl methyl carbonate, and a halogenated derivative thereof.

In some embodiments, the electrochemical energy storage apparatus may include an outer package for encapsulating the positive electrode plate, the negative electrode plate, and the electrolyte. In an example, the positive electrode plate, the negative electrode plate, and the separator may be stacked or wound to form an electrode assembly of a stacked structure or an electrode assembly of a wound structure, and the electrode assembly is encapsulated in the outer package. The electrolyte may use an electrolyte solution, and the electrolyte solution is immersed in the electrode assembly. There may be one or more electrode assemblies in the electrochemical energy storage apparatus, and a number of the electrode assemblies may be adjusted as required.

In some embodiments, the outer package of the electrochemical energy storage apparatus may be a soft package, for example, a soft bag. A material of the soft package may be plastic, for example, one or more of polypropylene (PP), polybutylene terephthalate (PBT), and polybutylene succinate (PBS). Alternatively, the outer package of the electrochemical energy storage apparatus may be a hard shell, for example, an aluminum shell.

Figure 5:
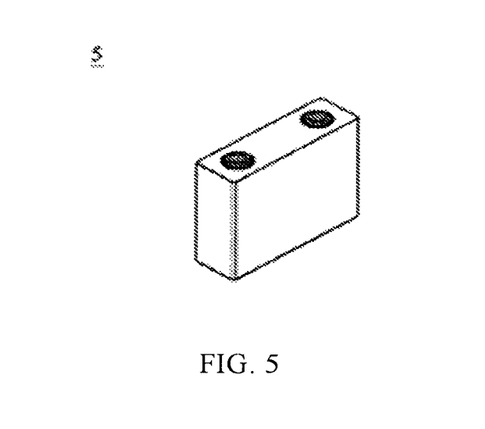
FIG. 5 is a perspective view of an embodiment of an electrochemical energy storage apparatus.

This application has no particular limitation on a shape of the electrochemical energy storage apparatus, and the electrochemical energy storage apparatus may be of a cylindrical, a square, or any other shapes. FIG. 5 shows an electrochemical energy storage apparatus 5 of a square structure as an example.

In some embodiments, the electrochemical energy storage apparatus may be assembled into a battery module, and the battery module may include a plurality of electrochemical energy storage apparatuses. A specific number may be adjusted based on application and capacity of the battery module.

Figure 6:
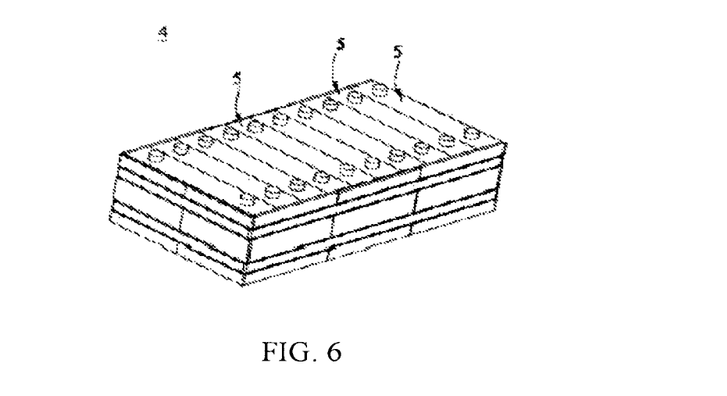
FIG. 6 is a perspective view of an embodiment of a battery module.

FIG. 6 shows a battery module 4 as an example. Referring to FIG. 6, in the battery module 4, a plurality of electrochemical energy storage apparatuses 5 may be arranged in sequence along a length direction of the battery module 4, or may be arranged in any other manners. Further, the plurality of electrochemical energy storage apparatuses 5 may be fastened by using a fastener.

Optionally, the battery module 4 may further include a housing that has an accommodating space, and the plurality of electrochemical energy storage apparatuses 5 are accommodated in the accommodating space.

In some embodiments, the foregoing battery module may be further assembled into a battery pack, and a number of battery modules included in the battery pack may be adjusted based on application and capacity of the battery pack.

Figure 7:
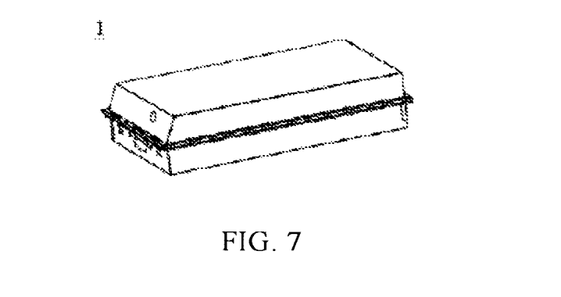
FIG. 7 is a perspective view of an embodiment of a battery pack.
Figure 8:
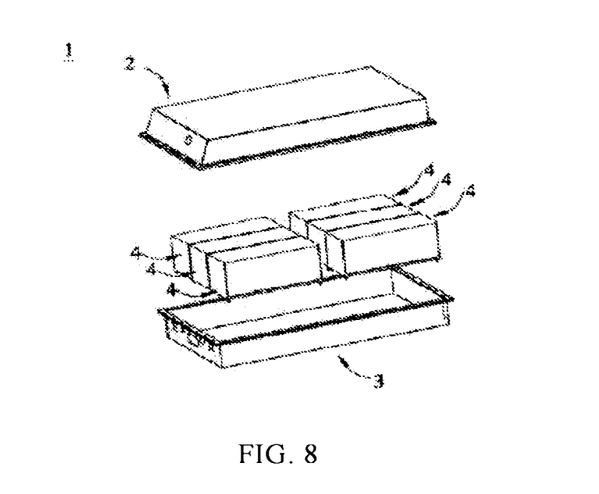
FIG. 8 is an exploded view of FIG. 7.

FIG. 7 and FIG. 8 show a battery pack 1 as an example. Referring to FIG. 7 and FIG. 8, the battery pack 1 may include a battery cabinet and a plurality of battery modules 4 disposed in the battery cabinet. The battery cabinet includes an upper cabinet body 2 and a lower cabinet body 3. The upper cabinet body 2 can cover the lower cabinet body 3 and form an enclosed space for accommodating the battery modules 4. The plurality of battery modules 4 may be arranged in the battery cabinet in any manner.

Finally described is the apparatus according to the sixth aspect of this application, the apparatus includes the electrochemical energy storage apparatus according to the fifth aspect of this application, and the electrochemical energy storage apparatus may serve as a power supply of the apparatus or serve as an energy storage unit of the apparatus. The apparatus includes but is not limited to an electric vehicle (for example, a pure-electric vehicle, a hybrid electric vehicle, a plug-in hybrid electric vehicle, an electric bicycle, an electric scooter, an electric golf vehicle, or an electric truck), an electric train, a ship, a satellite, and the like. In addition, the electric train, the ship, and the satellite all are carrying tools and belong to vehicles in a broad sense.

An electrochemical energy storage apparatus, a battery module, or a battery pack may be selected for the apparatus according to use requirements of the apparatus.

Figure 9:
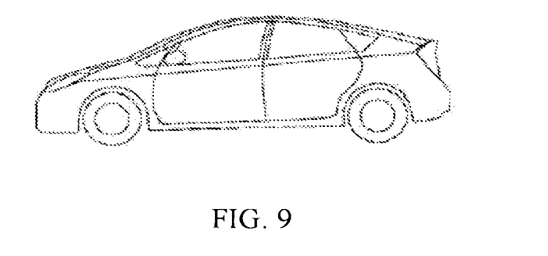
FIG. 9 is a schematic diagram of an embodiment of an apparatus using an electrochemical energy storage apparatus as a power supply.

FIG. 9 shows an apparatus as an example. The apparatus is a pure-electric vehicle, a hybrid electric vehicle, a plug-in hybrid electric vehicle, or the like. To meet requirements of the apparatus for high power and high energy density of an electrochemical energy storage apparatus, a battery pack or a battery module may be used.

The following further describes this application with reference to examples. It should be understood that these examples are merely used to describe this application but not to limit the scope of this application.

Lithium-ion batteries in Examples 1 to 8 and Comparative Examples 1 and 2 were prepared according to the following method.

(1) Preparation of a Positive Active Material

Ternary material precursors $Ni_{0.8}Co_{0.1}Mn_{0.1}(OH)_2$, $LiOH \cdot H_2O$, and $ZrO_2$ at a molar ratio of 0.997:1.05:0.003 were placed into a mixer for mixing, and then were placed into an oxygen-filled atmosphere furnace for sintering. After the sintering was completed, graded screening was performed to select an appropriate particle size, so as to obtain a positive active material $Li(Ni_{0.8}Co_{0.1}Mn_{0.1})_{0.997}Zr_{0.003}O_2$.

(2) Preparation of a Positive Electrode Plate

The positive active material, a binder polyvinylidene fluoride, and a conductive agent acetylene black were mixed at a mass ratio of 98:1:1, then N-methylpyrrolidone was added, and then the mixture was stirred evenly by using a vacuum mixer, to obtain a positive slurry. The positive slurry was uniformly applied onto a 12-μm-thick aluminum foil, namely, a positive electrode current collector, the aluminum foil was dried at room temperature and transferred to an oven at 100° C. to 130° C. for further drying, and then cold pressing and cutting were performed to obtain a positive electrode plate.

(3) Preparation of a Negative Electrode Plate

A negative active material graphite, a thickener sodium carboxymethyl cellulose, a binder styrene butadiene rubber, and a conductive agent acetylene black were mixed at a mass ratio of 97:1:1:1, deionized water was added, and the mixture was stirred by using a vacuum mixer to obtain a negative electrode slurry. The negative electrode slurry was uniformly applied onto an 8-μm-thick copper foil, the copper foil was dried at room temperature and transferred to an oven at 100° C. to 130° C. for further drying, and then cold pressing and cutting were performed to obtain a negative electrode plate.

(4) Preparation of an Electrolyte Solution

An organic solvent was a mixture of ethylene carbonate (EC), ethyl methyl carbonate (EMC), and diethyl carbonate (DEC), where a volume ratio of EC, EMC, and DEC was 20:20:60. In an argon atmosphere glove box with water content less than 10 ppm, fully dried lithium salt $LiPF_6$ was dissolved in the organic solvent to obtain an evenly mixed electrolyte solution, where concentration of the lithium salt was 1 mol/L.

(5) Preparation of a Separator

A 12-μm-thick polypropylene membrane was used as a separator.

(6) Preparation of a Lithium-Ion Battery

The positive electrode plate, the separator, and the negative electrode plate were stacked in sequence, so that the separator was sandwiched between the positive and negative electrode plates for isolation. After they were wound into a square-shaped electrode assembly, the electrode assembly was wrapped with an aluminum plastic film for baking at 80° C. to remove water. The electrolyte solution was injected, and sealing was performed. Then standing, hot-cold pressing, chemical conversion, clamping, aging, and other processes were performed to obtain a lithium-ion battery.

A lithium-ion battery in Example 9 was prepared according to the following method.

(1) Preparation of a Positive Active Material

Ternary material precursors $Ni_{0.8}Co_{0.1}Mn_{0.1}(OH)_2$, $LiOH \cdot H_2O$, and $ZrO_2$ at a molar ratio of 0.997:1.05:0.003 were placed into a mixer for mixing, and then were placed into an oxygen-filled atmosphere furnace for primary sintering. A material obtained after the primary sintering and 0.5 wt % $Al_2O_3$ were placed into the mixing device for mixing, and then were placed into the atmosphere furnace for secondary sintering. Then, graded screening was performed on a material obtained after the secondary sintering to select an appropriate particle size, so as to obtain a positive active material $Li(Ni_{0.8}Co_{0.1}Mn_{0.1})_{0.997}Zr_{0.003}O_2$ with $Al_2O_3$ on its surface.

(2) Preparation of a Positive Electrode Plate

The positive active material, a binder polyvinylidene fluoride, and a conductive agent acetylene black were mixed at a mass ratio of 98:1:1, then N-methylpyrrolidone was added, and then the mixture was stirred evenly by using a vacuum mixer, to obtain a positive slurry. The positive slurry was uniformly applied onto a 12-μm-thick aluminum foil, namely, a positive electrode current collector, the aluminum foil was dried at room temperature and transferred to an oven at 100° C. to 130° C. for further drying, and then cold pressing and cutting were performed to obtain a positive electrode plate.

(3) Preparation of a Negative Electrode Plate

A negative active material graphite, a thickener sodium carboxymethyl cellulose, a binder styrene butadiene rubber, and a conductive agent acetylene black were mixed at a mass ratio of 97:1:1:1, deionized water was added, and the mixture was stirred by using a vacuum mixer to obtain a negative electrode slurry. The negative electrode slurry was uniformly applied onto an 8-μm-thick copper foil, the copper foil was dried at room temperature and transferred to an oven at 100° C. to 130° C. for further drying, and then cold pressing and cutting were performed to obtain a negative electrode plate.

(4) Preparation of an Electrolyte Solution

An organic solvent was a mixture of ethylene carbonate (EC), ethyl methyl carbonate (EMC), and diethyl carbonate (DEC), where a volume ratio of EC, EMC, and DEC was 20:20:60. In an argon atmosphere glove box with water content less than 10 ppm, fully dried lithium salt $LiPF_6$ was dissolved in the organic solvent to obtain an evenly mixed electrolyte solution, where concentration of the lithium salt was 1 mol/L.

(5) Preparation of a Separator

A 12-μm-thick polypropylene membrane was used as a separator.

(6) Preparation of a Lithium-Ion Battery

The positive electrode plate, the separator, and the negative electrode plate were stacked in sequence, so that the separator was sandwiched between the positive and negative electrode plates for isolation. After they were wound into a square-shaped electrode assembly, the electrode assembly was wrapped with an aluminum plastic film for baking at 80° C. to remove water. The electrolyte solution was injected, and sealing was performed. Then standing, hot-cold pressing, chemical conversion, clamping, aging, and other processes were performed to obtain a lithium-ion battery.

A lithium-ion battery of Example 10 was prepared by using a method similar to the method for preparing the lithium-ion battery in Example 9, and a difference lied in that $Al_2O_3$ of 0.5 wt % was replaced with $B_2O_3$ of 0.5 wt % in Example 10.

Next, a test procedure for the lithium-ion battery is described.

(1) Test of Residual Lithium Content on a Surface of the Positive Active Material 30 g powder of the prepared positive active material was taken and added to 100 mL water for stirring for 30 min. Residual lithium in the to-be-tested sample was titrated with a standard hydrochloric acid solution. A composite pH electrode was used as an indicator electrode, and a titration endpoint was determined through a sudden jump caused by a potential change.

(2) Cycle Performance Test of the Lithium-Ion Battery at High Temperature

At 45° C., the lithium-ion battery was charged to a voltage of 4.2V at a constant current of 1 C, then the lithium-ion battery was charged to a current of 0.05 C at a constant voltage of 4.2V, and the lithium-ion battery was discharged to a final voltage of 2.8V at a constant current of 1 C. Discharge capacity of the first cycle was recorded. Then repeated charging and discharging was performed according to the foregoing operations. When 80% of initial capacity was reached after repetitions, charging and discharging stopped. In this case, a number of cycles was a high-temperature cycle life.

(3) Storage Performance Test of the Lithium-Ion Battery at High Temperature

At 25° C., first the lithium-ion battery was charged to 4.2V at a constant current of 1 C, then the lithium-ion battery was charged to a current of 0.05 C at a constant voltage of 4.2V, a volume of the lithium-ion battery was measured by using a drainage method, and the volume was recorded as an initial volume of the lithium-ion battery. Then the lithium-ion battery was stored at 80° C. for 10 days, a volume of the lithium-ion battery was measured again by using the drainage method after the storage was completed, and the volume was recorded as a volume of the lithium-ion battery stored at 80° C. for 10 days.

Volume swelling rate (%) of the lithium-ion battery stored at 80° C. for 10 days=[Volume of the lithium-ion battery stored at 80° C. for 10 days/ Initial volume of the lithium-ion battery-1]× 100%.

(4) Capacity Test of the Positive Active Material of the Lithium-Ion Battery

The lithium-ion battery was stood in a constant temperature environment of 25° C. for 2 hours, then charged to 4.2V at ⅓ C from 2.8V to 4.2V, then charged to a current less than or equal to 0.05 mA at a constant voltage of 4.2V, then stood for 5 min, and discharged to 2.8V at 1 C. Capacity of the lithium-ion battery was recorded, and the measured capacity was divided by the mass of the positive active material in the battery to obtain capacity of the positive active material in the lithium-ion battery.

TABLE 1

Parameters of the positive active materials in Examples 1 to 10 and Comparative Examples 1 and 2

| | $D_n10$ (μm) | $D_v10$ (μm) | $D_v50$ (μm) | $BET_2$ (m²/g) | $(BET_2-BET_1)/BET_1$ | Coating substance |
|---|---|---|---|---|---|---|
| Example 1 | 0.30 | 0.50 | 3.3 | 1.00 | 1.59 | \ |
| Example 2 | 0.60 | 0.90 | 4.0 | 0.80 | 1.51 | \ |
| Example 3 | 0.90 | 1.50 | 4.3 | 0.90 | 2.03 | \ |
| Example 4 | 1.30 | 2.10 | 5.1 | 1.10 | 3.39 | \ |
| Example 5 | 1.80 | 2.30 | 5.5 | 0.80 | 2.45 | \ |
| Example 6 | 2.00 | 3.00 | 6.0 | 0.70 | 2.29 | \ |
| Example 7 | 0.60 | 1.40 | 5.3 | 1.50 | 5.23 | \ |
| Example 8 | 0.80 | 1.30 | 2.5 | 0.70 | 0.37 | \ |
| Example 9 | 1.00 | 1.40 | 3.3 | 0.70 | 0.81 | $Al_2O_3$ |
| Example 10 | 0.80 | 1.50 | 2.5 | 0.80 | 0.57 | $B_2O_3$ |
| Comparative Example 1 | 0.10 | 1.10 | 4.0 | 0.50 | 0.57 | \ |
| Comparative Example 2 | 2.50 | 3.20 | 4.0 | 0.50 | 0.57 | \ |

TABLE 2

Performance test results of Examples 1 to 10 and Comparative Examples 1 and 2

| | $Li_2CO_3$ (ppm) | LiOH (ppm) | Positive active material capacity (mAh/g) | Number of cycles at 45° C. | Volume swelling rate after storage at 80° C. for 10 days |
|---|---|---|---|---|---|
| Example 1 | 2354 | 3451 | 196 | 1231 | 104% |
| Example 2 | 2234 | 3612 | 197 | 1104 | 99% |
| Example 3 | 2131 | 3588 | 195 | 1154 | 95% |
| Example 4 | 2554 | 3821 | 194 | 1097 | 93% |
| Example 5 | 2764 | 3353 | 193 | 1066 | 92% |
| Example 6 | 2481 | 3221 | 192 | 1012 | 90% |
| Example 7 | 2941 | 4312 | 196 | 1078 | 111% |
| Example 8 | 2651 | 4231 | 195 | 1208 | 106% |
| Example 9 | 2052 | 3125 | 195 | 1265 | 94% |
| Example 10 | 2024 | 3021 | 196 | 1198 | 92% |
| Comparative Example 1 | 3042 | 4675 | 196 | 998 | 142% |
| Comparative Example 2 | 2231 | 3541 | 190 | 1005 | 105% |

It can be learned from analysis of the test results in Table 2 that in the positive active materials of lithium-ion batteries of Examples 1 to 10, a relative amount of micro powder with a particle size less than 1 μm in the positive active material was smaller, and the positive active material had larger capacity. In addition, the lithium-ion battery had a higher high-temperature cycle life and a lower high-temperature storage volume swelling rate. Therefore, properly controlling particle morphology of the positive active material and an amount of micro powder in the positive active material could effectively reduce side reactions between the positive active material and the electrolyte solution, decrease gas production of the lithium-ion battery, and improve storage performance of the lithium-ion battery without deteriorating an energy density, cycle performance, and rate performance of the lithium-ion battery.

Figure 1:
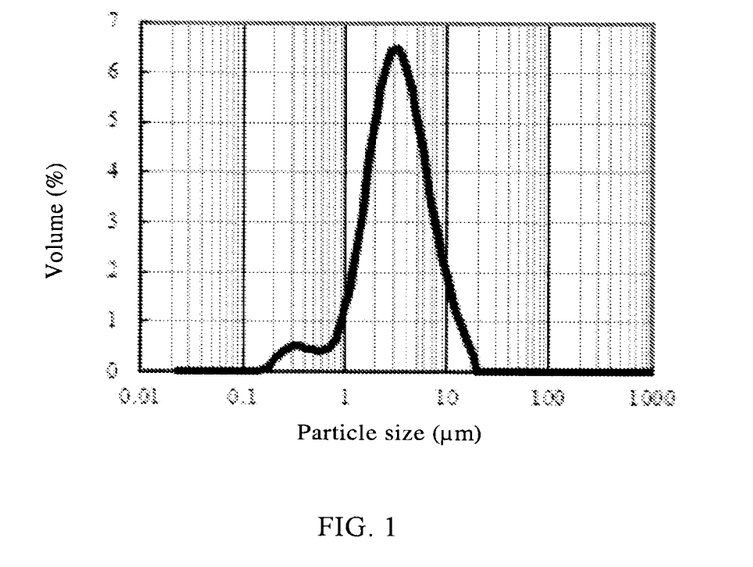
FIG. 1 is a differential volume-based particle size distribution curve of a positive active material in Comparative Example 1 of this application.
Figure 2:
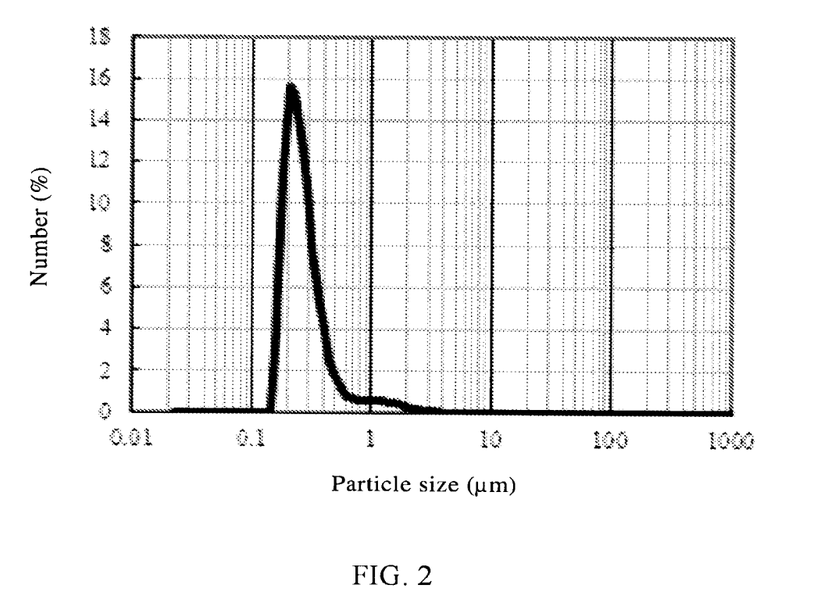
FIG. 2 is a differential number-based particle size distribution curve of a positive active material in Comparative Example 1 of this application.
Figure 3:
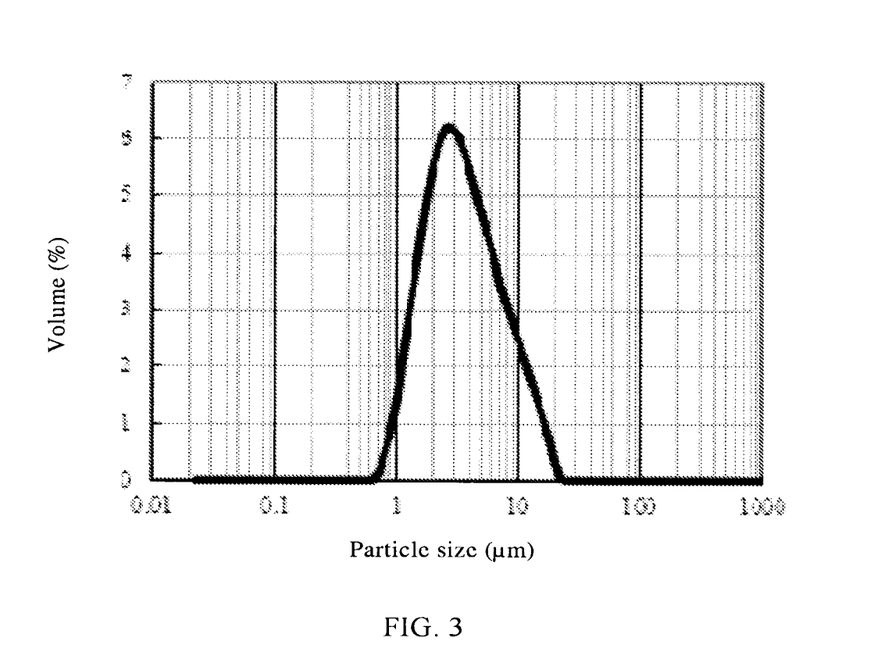
FIG. 3 is a differential volume-based particle size distribution curve of a positive active material in Example 3 of this application.
Figure 4:
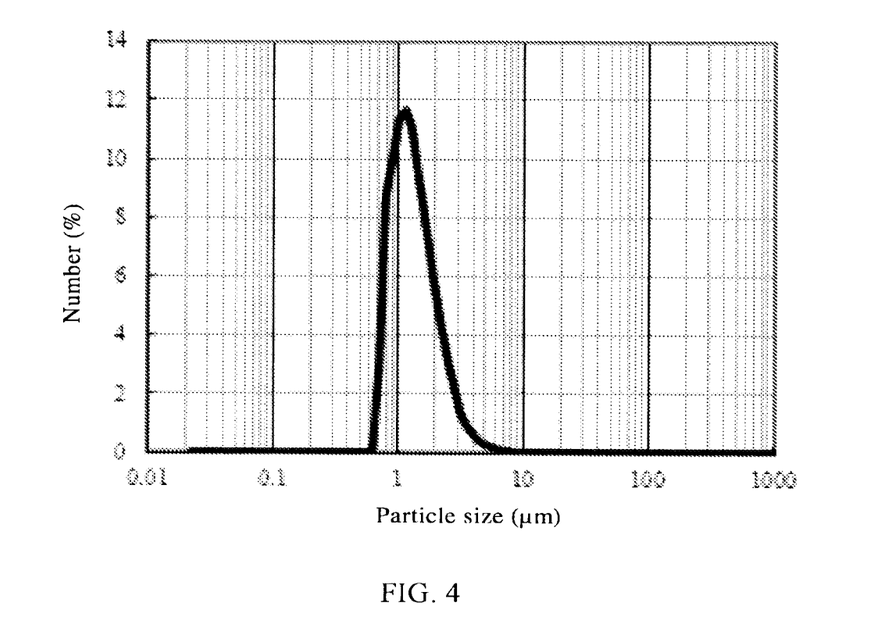
FIG. 4 is a differential number-based particle size distribution curve of a positive active material in Example 3 of this application.

In Comparative Example 1, $D_n10$ of the positive active material was further reduced to 0.1 m. It can be found, from the differential volume-based particle size distribution curve and the differential number-based particle size distribution curve in FIG. 1 and FIG. 2, that the particle size distribution curves of the positive active material both had two peaks. A possible reason was that a relative amount of micro powder in the positive active material was too large. With reference to FIG. 3 and FIG. 4, it can be learned that the differential volume-based particle size distribution curve and the differential number-based particle size distribution curve of the positive active material in this application each were both unimodal, which further indicated that a relative amount of micro powder in the positive active material was relatively small. When the relative amount of micro powder in the positive active material was too large, because a specific surface area of the micro powder was larger, an amount of residual lithium on the surface was higher, and a contact area with the electrolyte solution was larger, more side reactions occurred when the positive active material came into contact with the electrolyte solution. In order to maintain charge balance, the positive active material with micro powder released more oxygen, which not only destroyed a crystal structure of the positive active material, but also aggravated the swelling of the lithium-ion battery and deteriorated the storage performance of the lithium-ion battery.

In Comparative Example 2, $D_n10$ of the positive active material was 2.5 m. In this case, content of micro powder in the positive active material was relatively low, but due to particularity of single crystal or quasi-single crystal morphology, $D_v50$ needed to be kept within a specific range to maintain high ion transport performance and low polarization strength. Therefore, the particle size distribution of the positive active material was too narrow; as a result, for particle sizes of the positive active material, matching of small and large particles could not be implemented, and it was difficult to achieve a high compaction density. Particles of the positive active material were more likely to be crushed during processes of cold pressing and battery cycling of the electrode plate, resulting in direct contact between a large amount of fresh surfaces and the electrolyte solution, which aggravated the swelling of the lithium-ion battery.

It could also be found, through further analysis of test results of Examples 1 to 8, that controlling a degree of deviation between a theoretical specific surface area $BET_1$ and an actual specific surface area $BET_2$ of the positive active material could further optimize a micro structure of the positive active material, to ensure that a surface of the single crystal or quasi-single crystal positive active material has fewer unevenness structures. This was helpful in reducing the polarization of the positive active material, improving ion transport performance, further decreasing the gas production of the lithium-ion battery, and optimizing dynamic performance of the lithium-ion battery.

Compared with Example 1, Examples 9 and 10 provided a positive active material obtained by coating the surface of the positive active material in Example 1. After the coating, direct contact between $Li(Ni_{0.8}Co_{0.1}Mn_{0.1})_{0.997}Zr_{0.003}O_2$ and the electrolyte solution could be avoided, and a probability of side reactions between the positive active material and the electrolyte solution could be reduced. In addition, a coating layer with $Al_2O_3$ and $B_2O_3$ had good ion conductivity and electron conductivity, which could alleviate the gas production problem while minimizing impact of the coating layer on the polarization of the positive active material.

What is claimed is:

1. An electrochemical energy storage apparatus, wherein the electrochemical energy storage apparatus comprising positive active material and negative active material, the positive active material is ternary materials comprising Ni, Co, and M, the ratio of nickel, cobalt and manganese is y:z:k, y+z+k=1, 0.7≤y≤0.9, M is selected from one or two of Mn and Al;

the actual specific surface area BET2 of the positive active material is 0.5 m²/g to 1.5 m²/g;

the particle size Dn10 of the positive active material satisfies: 0.3 μm≤Dn10≤2 μm, the particle size Dv10 of the positive active material satisfies: 0.5 μm≤Dv10≤3 μm;

Dn10 is a corresponding particle size when a cumulative number distribution percentage of the positive active material reaches 10%;

Dv10 is a corresponding particle size when a cumulative volume distribution percentage of the positive active material reaches 10%.

2. The electrochemical energy storage apparatus according to claim 1, wherein the particle size Dn10 of the positive active material satisfies:

0.5 μm≤Dn10≤1.5 μm.

3. The electrochemical energy storage apparatus according to claim 1, wherein the particle size Dv10 of the positive active material satisfies: 1 μm≤Dv10≤2 μm.

4. The electrochemical energy storage apparatus according to claim 1, the positive active material is single crystal or quasi-single crystal particles.

5. The electrochemical energy storage apparatus according to claim 1, wherein the surface of positive active material comprising a coating layer, the coating layer comprising one or more coating elements.

6. The electrochemical energy storage apparatus according to claim 5, wherein the one or more coating elements selected from Al, Ba, Zn, Ti, Co, W, Y, Si, Sn, B, and P.

7. The electrochemical energy storage apparatus according to claim 5, wherein the coating layer comprising at least two coating elements.

8. The electrochemical energy storage apparatus according to claim 5, wherein the content of $Li_2CO_3$ on the surface of the positive active material is less than that of LiOH.

9. The electrochemical energy storage apparatus according to claim 8, wherein the content of $Li_2CO_3$ is less than 3000 ppm, and the content of LiOH is less than 5000 ppm.

10. The electrochemical energy storage apparatus according to claim 1, wherein the particle size $D_v50$ of the positive active material is 1 μm to 6 μm.

11. The electrochemical energy storage apparatus according to claim 1, wherein the particle size $D_v50$ of the positive active material is 2 μm to 5 μm.

12. The electrochemical energy storage apparatus according to claim 1 wherein the particle size Dn10 of the positive active material measured in μm and a particle size Dv10 of the positive active material measured in μm satisfy: 0.15≤Dn10×Dv10≤6.

13. The electrochemical energy storage apparatus according to claim 1, wherein a theoretical specific surface area $BET_1$ of the positive active material and an actual specific surface area $BET_2$ of the positive active material satisfy: 0.3≤(BET$_2$−BET$_1$)/BET$_1$≤5.5, BET$_1$=6/(ρ×D$_v$50), ρ is an actual density of the positive active material, and a unit of measurement is g/cm³; and D$_v$50 is a corresponding particle size when the cumulative volume distribution percentage of the positive active material reaches 50%, and a unit of measurement is μm.

14. The electrochemical energy storage apparatus according to claim 1, wherein the negative active material comprising one or a combination of silicon-oxygen compound, and a silicon-carbon composite.

15. The electrochemical energy storage apparatus according to claim 1, wherein the electrochemical energy storage apparatus also comprising an electrolyte solution, the electrolyte solution comprising electrolyte and solvent, concentration of the electrolyte is 0.8 mol/L to 1.5 mol/L, the electrolyte comprising one or a combination of $LiPF_6$, and $LiN(SO_2F)_2$ (LiFSI).

* * * * *